United States Patent Office 2,794,826
Patented June 4, 1957

2,794,826

PROCESS OF MANUFACTURING LINALYL ACETATE

Alan Bell, Charles J. Kibler, and Thomas H. Strickland, Kingsport, Tenn., assignors to Eastman Kodak Company, Rochester, N. Y., a corporation of New Jersey No Drawing. Application November 18, 1952, Serial No. 321,284

7 Claims. (Cl. 260—489)

This invention relates to a process of manufacturing linalyl acetate from linalyl chloride.

In the copending application of Bell and Strickland, Serial No. 288,034, filed May 15, 1952, now abandoned there is disclosed and claimed a process of preparing linalyl and geranyl halides from hydrogen halide and myrcene. As shown in that application, linalyl and geranyl halides can be prepared by treating myrcene with a hydrogen halide selected from the group consisting of hydrogen chloride and hydrogen bromide. The reaction may be represented as follows, although the amounts of linalyl halide and geranyl halide formed are not necessarily equal:

benzene. Chlorinated solvents such as tetrachloroethane and chlorobenzene also have been used. Of course, the solvent should be one which does not itself react with hydrogen halide under the reaction conditions employed. The reaction may be carried out without a solvent, but it is very vigorous and more difficult to control. Any pressure between 1 and 2 atmospheres may be used. Mixtures of linalyl and geranyl chlorides thus prepared have been referred to in the Bell and Strickland application as "myrcene hydrochloride," and will be so referred to in this application, for convenience. As is pointed out in the Bell and Strickland application, the "myrcene hydrochloride" may also contain some cyclic chlorides, and the proportions of the various chlorides may vary, depending on the conditions of hydrochlorination. However, it has been found that the "myrcene hydrochloride" prepared by the process claimed in Bell and Strickland application Serial No. 288,034 is predominantly linalyl chloride. This has been definitely determined by examination of infrared spectra.

We have found a method of preparing linalyl acetate, in good yields and substantially free from chlorine compounds, from the linalyl chloride prepared by the process of Bell and Strickland application Serial No. 288,034. As is pointed out in that application, the various products formed by the process of that application may be separated by careful fractional distillation. However, we

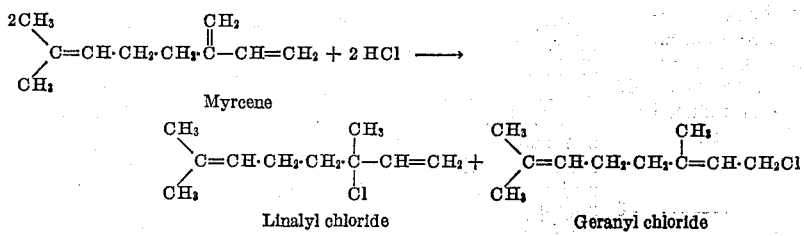

Some cyclic halides may also be formed. The various products may be separated by careful fractional distillation, but in most cases it is more economical to use the mixture of halides.

Myrcene may be hydrohalogenated in the absence of a solvent, or in the presence of polar or non-polar solvents, but we prefer to employ a non-polar solvent. The proportions of the various halides formed may vary, depending upon the conditions of hydrohalogenation. The solvent used may conveniently be that solvent which is desirable for use in the reaction in which the linalyl and geranyl halides are to be used.

The preferable temperature for carrying out this reaction when benzene is used as a solvent is 35-40° C., but other temperatures can be used. At lower temperatures, a slower rate of reaction is observed. Higher temperatures, up to the boiling point of the solvent, can also be employed, but the reaction rate is again slower unless the hydrogen chloride is applied under a greater pressure.

Other non-polar solvents, such as xylene, toluene, hexane, naphtha and the like may be used in place of prefer to use the mixture of chlorides ("myrcene hydrochloride"). When we use the mixture, we obtain a minor proportion of geranyl acetate along with linalyl acetate. Under the best conditions, the proportions are about 80% linalyl acetate and 20% geranyl acetate. The two acetates may be separated by fractional distillation.

The reaction involved in the process of our invention may be represented as follows:

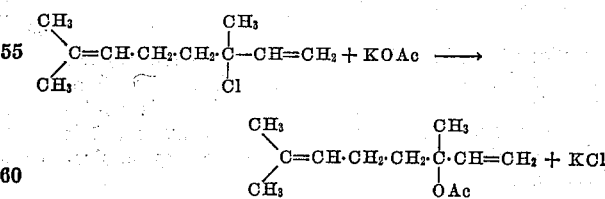

Thus, we are dealing with a reaction in which the halogen atom of a tertiary alkyl halide is replaced by an acetoxy group. It is well known that replacement reactions are more difficult to carry out with a tertiary alkyl halide than with a primary alkyl halide, because of the greater tendency in tertiary alkyl halides to eliminate hydrogen halide and form hydrocarbons. For example, Hickinbottom—Reactions of Organic Compounds, 2nd edition (1948), states on pages 415–416: "Reaction between alkyl halides and salts of carboxylic acids results in the formation of esters. . . . The general procedure is to allow the halogen compound to react with the silver salt of the appropriate acid, or more generally to heat the halogen compound with the potassium salt in a solution of the corresponding acid. Primary alkyl halides react normally; secondary halides furnish a poorer yield of ester owing to their greater tendency to eliminate halogen hydride; tert.-alkylhalides, however, yield olefin as the principal product."

We have discovered that under certain conditions, 45–55% yields of linalyl acetate, free from chlorine compounds, can be obtained by the treatment of "myrcene hydrochloride" with potassium acetate. The solvent which we use for carrying out the reaction is acetic anhydride. If acetic acid is used as a solvent, the product is chiefly geranyl acetate. As a catalyst, we use cuprous iodide, or substances producing cuprous iodide, e. g. a mixture of cuprous chloride and potassium iodide.

By way of illustrating our process and the criticalness of certain conditions, we give the following examples.

*Example (Example 18 in table below)*

A mixture of 75 g. (0.75 mole) of anhydrous potassium acetate and 125 cc. of acetic anhydride is placed in a 500 cc. flask and the suspension heated with stirring to 120° C. A catalyst mixture consisting of 0.5 g. copper powder, 0.5 g. cuprous chloride, and 1.6 g. of potassium iodide is added, followed immediately by the addition of 0.5 mole of myrcene hydrochloride in 62.5 cc. of toluene. The reaction mixture is stirred at 119–121° C. for 6 hours and then cooled to room temperature. Water (200–300 cc.) is added and the mixture stirred for 2 hours with sufficient cooling to keep the temperature at 20–30° C. The organic layer is separated, filtered, and washed with water, dilute sodium bicarbonate solution, and finally again with water. The last traces of moisture are removed by azeotropic drying at reduced pressure. The product is distilled through an efficient column.

| Fraction | Boiling Point, °C. | Pressure (mm. Hg) | Weight, g. | $n_D^{20}$ |
| --- | --- | --- | --- | --- |
| 1 | 40–75 | 3.8–4.5 | 11.5 | 1.4749 |
| 2 | 75–81 | 4.5–4.8 | 3.5 | 1.4694 |
| 3 | 81–82 | 4.8 | 2.7 | 1.4558 |
| 4 | 82–83 | 4.8 | 1.8 | 1.4538 |
| 5 | 83 | 4.8 | 6.9 | 1.4512 |
| 6 | 83 | 4.8 | 6.5 | 1.4512 |
| 7 | 83 | 4.8 | 7.2 | 1.4513 |
| 8 | 83–85 | 4.8 | 4.0 | 1.4516 |
| 9 | 85–86 | 4.8 | 4.3 | 1.4519 |
| 10 | 86–87 | 4.8 | 4.0 | 1.4529 |
| 11 | 87–89 | 4.8 | 2.1 | 1.4536 |
| 12 | 89–90 | 4.8 | 2.5 | 1.4551 |
| 13 | 90–81 | 4.8–0.8 | 9.1 | 1.4592 |
| Residue | | | 9.0 | |

Fractions 3–12 inclusive (42 g., 42.9% of theory) are essentially linalyl acetate. Fraction 13 (9.1 g., 9.3% of theory) is chiefly geranyl acetate. Fraction 1 is a mixture of myrcene, and other terpenes, while fraction 2 is a mixture of terpenes, terpene halides, and terpene alcohol esters.

*Examples 1–19*

The procedure is identical to that described in the detailed example except that the catalyst mixture is varied. The catalyst and the results obtained in these experiments are listed in the following table:

| Example | Catalyst | Chlorine Content (Crude, Percent) | Total Esters, g. | Linalyl Acetate, g. | Residue, g. |
| --- | --- | --- | --- | --- | --- |
| 1 | No catalyst | 0.71 | 24.0 | Very little | 6.2 |
| 2 | 0.5 g. Ag / 1.0 g. AgOAc | 1.52 | 28.7 | do | 4.5 |
| 3 | 0.8 g. KI | 0.18 | 15.6 | do | 11.0 |
| 4 | 4 g. Cu | 0.68 | 39.6 | 24.5 | 22.4 |
| 5 | 2 g. CuCl | 2.01 | 51.8 | 26.0 | 7.2 |
| 6 | 4 g. CuCl | 1.57 | 48.9 | 35.2 | 12.0 |
| 7 | 0.5 g. Cu / 0.5 g. CuCl | 2.11 | 50.8 | 38.0 | 11.1 |
| 8 | 0.5 g. Cu / 0.5 g. CuCl / 2.5 cc. HOAc | 0.55 | 45.3 | 35.7 | 16 |
| 9 | 0.5 g. Cu / 0.5 g. CuCl / 5.0 cc. HOAc | 0.44 | 46.2 | 33.6 | 15 |
| 10 | 0.5 g. Cu / 0.5 g. CuCl / 10.0 cc. HOAc | 0.06 | 37.1 | Very little | 15 |
| 11 | 0.5 g. CuI | 0.13 | 31.8 | 8.6 | 7.0 |
| 12 | 2.0 g. CuI | 0.09 | 47.7 | 36.7 | 5.3 |
| 13 | 4.0 g. CuI | 0.23 | 43.8 | 35.0 | 5.5 |
| 14 | 1.0 g. CuCl / 1.6 g. KI | 0.45 | 47.2 | 38.3 | 8.0 |
| 15 | 0.5 g. Cu / 0.5 g. CuCl / 0.1 g. KI | 0.27 | 32.0 | 23.0 | 16.5 |
| 16 | 0.5 g. Cu / 0.5 g. CuCl / 0.4 g. KI | 0.11 | 43.5 | 30.9 | 13.5 |
| 17 | 0.5 g. Cu / 0.5 g. CuCl / 0.8 g. KI | 0.13 | 44.9 | 28.3 | 13.0 |
| 18 | 0.5 g. Cu / 0.5 g. CuCl / 1.6 g. KI | 0.29 | 51.1 | 42.0 | 9.0 |
| 19 | 0.5 g. Cu / 0.5 g. CuCl / 3.2 g. KI | 0.08 | 43.6 | 32.9 | 10.5 |

The conditions used in the process have been developed with three main considerations. These are: (1) to get the maximum yield of total esters; (2) to get the maximum yield of linalyl acetate; (3) to obtain a product relatively free of chloride. The importance of the first two considerations is obvious. The third point is of importance since linalyl acetate is used chiefly in perfumery and the presence of chloride adversely affects the odor. It is possible to remove the chloride by fractional distillation, but this is a costly and wasteful procedure due to the proximity of the respective boiling points.

It is significant that potassium acetate is necessary as a reactant in our process. Sodium acetate, calcium acetate, cupric acetate, silver acetate, and lead acetate under the same conditions give much lower yields of linalyl acetate.

The introduction of substantial amounts of acetic acid results in rearrangement of the linalyl acetate. The product in this case is chiefly geranyl acetate mixed with some cyclic terpinyl acetates (see Example 10, as compared with Examples 7, 8 and 9).

Linalyl acetate is not produced in substantial amounts if a catalyst is not used (see Example 1). The product is geranyl acetate and other terpinyl acetates. Linalyl acetate is not produced in substantial amounts if the catalyst is silver and silver acetate (see Example 2). Linalyl acetate is not produced in substantial amounts when potassium iodide is used alone as a catalyst (see Example 3). The use of copper powder alone results in high residue (see Example 4).

The use of cuprous iodide, or of a mixture of cuprous chloride and potassium iodide, gives a product low in chlorine (see Examples 11–19, as compared to Examples 5–7, in which cuprous chloride was used alone or with copper powder). Sodium iodide may be used in place of potassium iodide, with equally good results. Other sources of iodide ions, such, for example, as ammonium iodide, strontium iodide, magnesium iodide and calcium iodide may also be used in place of potassium iodide. Cuprous bromide may be used in place of cuprous chloride, as a source of cuprous ion.

Appreciable amounts of cuprous iodide were required in order to get substantial yields of linalyl acetate (see Examples 12-14). However, it is possible that with better agitation, smaller amounts of cuprous iodide might have given comparable results.

The procedure outlined in the detailed example above has also been used to prepare linalyl propionate and linalyl butyrate, using the appropriate acid anhydride and potassium salt.

Essentially the same results may be obtained in Examples 1-19 if the temperature is raised to 126-128° C. (reflux) and the heating time is reduced to 2.5-3 hours. Lower temperatures require longer heating periods; with higher temperatures, shorter heating periods suffice.

Linalyl bromide ("myrcene hydrobromide") may be used in place of linalyl chloride. Example 20 was carried out in the same manner as the detailed example above, except that linalyl bromide was used as starting material. The results were as follows:

| Example | Catalyst | Bromine Content (Crude, percent) | Total Esters, g. | Linalyl Acetate, g. | Residue, g. |
|---|---|---|---|---|---|
| 20 | 2.0 g. CuI | 0.2 | 44.6 | 36.1 | 9.2 |

What we claim as our invention and desire to be secured by Letters Patent of the United States is:

1. A process of preparing linalyl acetate of which the chlorine content is less than 0.5%, which comprises reacting linalyl chloride with potassium acetate in acetic anhydride in the absence of quantities of acetic acid substantially exceeding 4% of the weight of acetic anhydride present, in the presence of a catalyst comprising cuprous iodide.

2. A process according to claim 1, in which the linalyl chloride is present in a mixture which comprises geranyl chloride.

3. A process according to claim 1, in which the catalyst also comprises copper powder.

4. A process according to claim 1, in which the cuprous iodide is formed in situ from cuprous chloride and an iodide selected from the group consisting of potassium iodide and sodium iodide.

5. A process according to claim 4, in which the catalyst also comprises copper powder.

6. A process of preparing a linalyl acylate selected from the group consisting of linalyl acetate, linalyl propionate and linalyl butyrate, of which the halogen content is less than 0.5%, which comprises reacting a linalyl halide selected from the group consisting of linalyl chloride and linalyl bromide with the potassium salt of the organic acid corresponding to the acylate to be formed, in the anhydride of the same organic acid, in the absence of quantities of organic acid substantially exceeding 4% of the weight of organic acid anhydride present in the presence of a catalyst comprising cuprous iodide.

7. A process according to claim 6, in which the cuprous iodide is formed in situ from a source of cuprous ions and a source of iodide ions.

References Cited in the file of this patent

UNITED STATES PATENTS 2,609,388    Knapp _____ Sept. 2, 1952

OTHER REFERENCES

Fornet Der Parfumeur Zeit, vol. 10 (1936), pp. 739-41.

Simonsen et al.: "The Terpenes" (published by Cambridge University Press, Cambridge, England, 2nd Ed. 1947), vol. 1, pp. 63-64.